Sept. 21, 1948.  R. L. EICHBERG ET AL  2,449,550
BATTERY ADAPTER
Filed Nov. 23, 1944
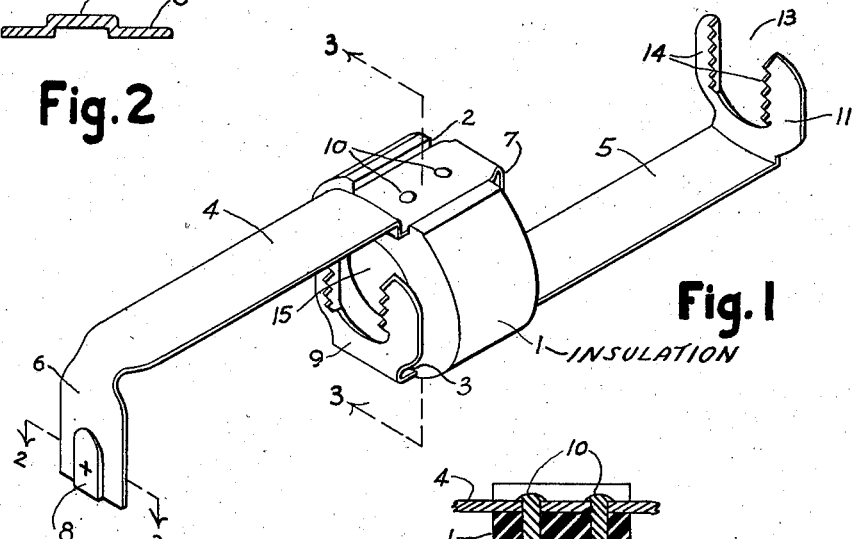
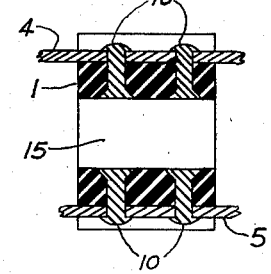
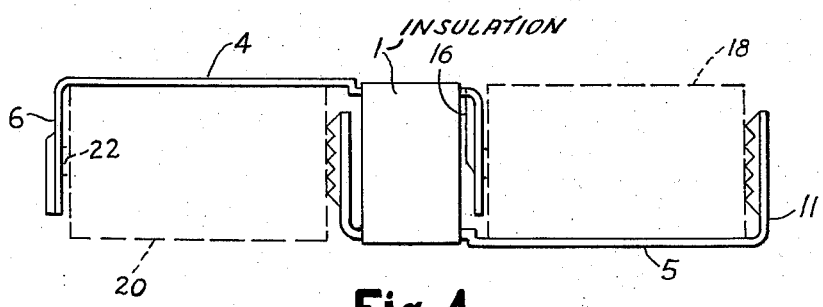
ROBERT L. EICHBERG
HOMER R. MONTAGUE
Inventors
By William D. Hall.
Attorney

UNITED STATES PATENT OFFICE 2,449,550

BATTERY ADAPTER

Robert L. Eichberg, Arlington, Va., and Homer R. Montague, Washington, D. C.

Application November 23, 1944, Serial No. 564,890

3 Claims. (Cl. 136—173)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to power supplies of the type utilizing conventional dry cell batteries, and more particularly to supplies, such as the filament supply for a small radio set, which involve current drains of such magnitude that conventional sizes of flashlight cells do not provide an adequate operating life between changes of batteries.

In a particular type of transceiver which has become popularly known as the "handie-talkie" due to its general resemblance to the handset of a conventional desk telephone, the filament voltage required is 1.5 volts; that is, the nominal voltage of an ordinary sal-ammoniac dry cell. The current drain of such a set, however, is of such magnitude that a single cell of flashlight size (about 1¼ inches in diameter and 2¼ inches long) would not provide adequate operating life before replacement. Thus, the operation of changing filament batteries becomes an unreasonable burden upon the operator of such equipment, and results in frequent interruptions to communication.

The obvious solution to this problem, that is, to use a larger filament battery, is precluded insofar as small portable devices are concerned, by the fact that the next larger battery which is sufficiently well distributed to facilitate supply, is about 2 inches in diameter and 6 inches long, and weighs over 2 pounds. This size and weight is clearly intolerable in equipment intended for maximum portability.

Designers of small radio sets, faced with this situation, have been forced to adopt the expedient of utilizing a single cell (1½ volt) filament battery of intermediate size. The fact that such a battery is of an unusual size not adapted for general use has the effect of increasing its cost, as well as of rendering it relatively difficult to obtain at the point of use. In the example under consideration, the diameter of this battery is the same as that of an ordinary flashlight cell, but its length is about 2½ times as great.

It would clearly be desirable to avoid the use of such a special battery in favor of the cheap, mass-production, widely distributed flashlight cell referred to in the second paragraph of this specification, and particularly if this could be accomplished without modification of existing equipment designed to use the expensive, special, intermediate size of battery.

It is hence an object of our invention to provide a device accomplishing all the desirable results of the preceding paragraph, and of such design that it will be economical to produce and substantially foolproof in operation. We accomplish this by an adapter designed to hold two ordinary flashlight cells in coaxial positions, but so constructed as to connect the two electrically in parallel. By proper design, matters can be so arranged that the electrical terminals of such a device are located precisely where they would be if the single, special size battery referred to above were to be used; also, it is possible to so design the adapter that the complete assembly has a diameter only slightly larger than that of the special battery it replaces. Thus, the assembly can be substituted for the special battery without any modification of the equipment into which it is inserted, and can be refilled when fresh batteries are required.

Our invention will be best understood by reference to the accompanying drawing illustrating one embodiment of our invention, and in which Figure 1 is a perspective view of a complete adapter, Figure 2 is a sectional view taken on line 2—2 of Figure 1, Figure 3 is a partial sectional view taken on line 3—3 of Figure 1, and Figure 4 is an elevation view of the complete device, with a pair of ordinary flashlight cells, shown by dash lines, in their proper positions.

Referring now to Figure 1 of the drawing, the numeral 1 designates a short cylindrical piece of an insulating material such as "Bakelite," having two opposite sides provided with flat portions forming seats 2 and 3. Rigidly secured to the seat 2, as by rivets 10, is an elongated narrow member 4 of springy, electrically conducting material such as metal, having turned-down ends 6 and 7. End 6 has a centrally-located struck-up dimple 8, more clearly shown in Figure 2, while end 7 has a similar dimple 16 as shown in Figure 4. The ends 6 and 7 are similar, except that the dimple 8 opens downwardly in Figure 4, while dimple 16 opens upwardly in that figure.

Rigidly secured in seat 3 of member 1 is a second elongated member 5 also of springy conducting material and having turned-up ends 9 and 11. Each of these end pieces has an opening such as that designated by 13 in Figure 1, bounded on two sides by rows of teeth 14 which extend at right angles to the surface of such end pieces.

The length of members 4 and 5 and the length of member 1 are so chosen that the space between the inner surface of dimple 8 and the outer edge of the teeth 14 on end piece 9 is just sufficient to permit an ordinary flashlight cell 20 (shown in dash lines in Figure 4) to be inserted therebetween, with its cap terminal (positive) held between the walls of dimple 8, and its flat bottom terminal (negative) in contact with teeth 14. Sufficient exial pressure is present to retain the cell in that position.

Similarly, a second flashlight cell can be inserted between end piece 7 of member 4 and end piece 11 of member 5, by sliding it from above, with respect to the orientation shown in Figure 4. It is for this reason that dimple 16 is open upwardly rather than downwardly as is dimple 8.

From the above description, it will be seen that the positive terminals of both flashlight batteries are connected together by member 4, as are their negative terminals by member 5. Also, it will be observed that the outer surface of dimple 8 acts as a central positive terminal for connecting the assembly into a device adapted to take an elongated size of dry cell, while the outer surface of end piece 11 is located precisely where the negative terminal (the bottom of the zinc can) of such a cell would be.

Members 4 and 5 may be somewhat bowed transversely of their length, as shown in Figure 1, to minimize the diametral space occupied by the assembly.

Member 1 is shown as having a central bore 15 (Figures 1 and 3); the purpose of this opening is to facilitate the securing of members 4 and 5 to member 1 in the manufacture of the device.

The purpose of providing openings such as 13 in members 9 and 11 is threefold. First, the formation of spaced rows of teeth 14 is facilitated, which is desirable since such teeth make a better contact than would a mere roughened flat surface. Second, these openings minimize the danger of inserting one of the cells in the wrong orientation, since the flat cap such as 22 in Figure 4 will not make positive contact with the edges of opening 13. Reversal of one of the cells would of course result in a large circulating current which would soon destroy both cells. Third, the provision of an opening 13 in end piece 9 permits the introduction of a mandrel into bore 15 (Figure 3) for facilitating the riveting of members 4 and 5 to member 1. Without this opening 13, the assembling of such members would be quite difficult and expensive, since both ends of bore 15 would be obstructed by the inner turned-over ends of elements 4 and 5.

The provision of open-ended dimples 8 and 16 rather than simple depressions to receive caps 22 of the flashlight cells, greatly increases the ease with which the latter can be inserted and removed from the adapter, without unduly increasing the risk of the cells' slipping out by accident.

It is obvious that either or both of members 4 and 5 can be coated lengthwise with a suitable insulating material if the adapter is to be used in locations where external contact to such members is undesirable.

It will be seen from the above description that we have devised an extremely simple device, having only 3 principal parts, which performs the function of holding two dry cells securely in coaxial relationship, connects them electrically in parallel without the use of additional parts, is cheap to produce, foolproof in operation, and is of substantially the same dimensions as the special-purpose battery which is to be replaced.

The reference herein to specific applications of our device, for instance to radio sets, is not to be construed to limit the device to such uses, since it may be utilized wherever it is desired to build up large capacity batteries from small cells.

We claim.

1. In a battery adapter for holding a plurality of cells in parallel electrical connection, a short central mounting member of insulating material, a pair of elongated, electrically conductive straps, each having a bent-over portion at each end, and means for securing said straps to different faces of said mounting member so that the four bent-over ends lie substantially along a common axis with the inner face of one end of each strap lying adjacent to, and facing, one end of the mounting member, one bent over portion of each strap having a medial opening therein to prevent improper orientation of the cells.

2. A device as covered by claim 1, in which the mounting member is of cylindrical shape having a central bore, and in which the bent-over ends of one strap have each a struck-up dimple, and the bent-over ends of the other strap have each a medial opening bordered on opposite edges by rows of teeth directed normal to the planes of said openings.

3. A battery adapter for holding a plurality of cells in parallel electrical connection having in combination a short solid cylindrical mounting member of relatively stiff and inflexible insulating material and having an axial bore therethrough, a pair of electrically conducting straps, each of said straps having an end thereof mounted on an opposite face of said cylindrical member, one end of each of said straps being bent over an end of said cylindrical member, said strap ends being formed with a slot therein aligned with the bore of said cylindrical member, said slot being bordered with upstanding teeth, the other end of each of said straps being bent over and provided with a raised channel to receive the center electrode of a dry cell, the four bent over ends lying along a common axis.

ROBERT L. EICHBERG.
HOMER R. MONTAGUE.

REFERENCES CITED

The following references are of record in the file of this patent:

UNITED STATES PATENTS

| Number | Name | Date |
|---|---|---|
| 2,036,088 | Darling | Mar. 31, 1936 |
| 2,293,354 | Munchow | Aug. 18, 1942 |
| 2,377,161 | Le Strange | May 29, 1945 |